(12) United States Patent
Katayama et al.

(10) Patent No.: US 8,838,661 B2
(45) Date of Patent: Sep. 16, 2014

(54) RADIX-8 FIXED-POINT FFT LOGIC CIRCUIT CHARACTERIZED BY PRESERVATION OF SQUARE ROOT-I OPERATION

(75) Inventors: Yasunao Katayama, Kanagawa-ken (JP); Kohji Takano, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 13/300,710

(22) Filed: Nov. 21, 2011

(65) Prior Publication Data
US 2012/0143936 A1 Jun. 7, 2012

(30) Foreign Application Priority Data
Dec. 7, 2010 (JP) ................................. 2010-272947

(51) Int. Cl.
G06F 17/14 (2006.01)

(52) U.S. Cl.
CPC ................................. *G06F 17/142* (2013.01); *G06F 17/141* (2013.01)
USPC ........... 708/405; 708/400; 708/404; 708/406; 708/409

(58) Field of Classification Search
None
See application file for complete search history.

(56) References Cited

U.S. PATENT DOCUMENTS

| 6,728,742 B1 * | 4/2004 | Hertz ............................. 708/404 |
| 2004/0111227 A1 * | 6/2004 | Stein et al. ....................... 702/77 |
| 2005/0289207 A1 | 12/2005 | Lee et al. |
| 2006/0282764 A1 | 12/2006 | Lee et al. |

FOREIGN PATENT DOCUMENTS

| WO | WO 2007/115329 A2 | 10/2007 |
| WO | WO 2009/142563 A1 | 11/2009 |

OTHER PUBLICATIONS

Cooley et al., "An algorithm for the machine calculation of complex Fourier series," Math. Comput. 19, 297-301, 1965.
Lee, Yu-Heng George, "Dynamic Kernel Function for High-Speed Real-Time Fast Fourier Transform Processors", Wright State University, 2009.
Wei-Hsin Chang et al., "On the Fixed-Point Accuracy Analysis of FFT Algorithms," Signal Processing, IEEE Transactions on, vol. 56, No. 10, pp. 4673-4682, Oct. 2008.

* cited by examiner

*Primary Examiner* — Michael D Yaary
(74) *Attorney, Agent, or Firm* — Jeff Tang

(57) ABSTRACT

A system and method to reduce roundoff error of Fast Fourier transform (FFT) operation. Data which comes out as an irrational number (a square root) out of twiddle factors on a complex plane, included in a butterfly operation (8p) is preserved intentionally without being calculated in one stage of multiple stages of a multi-stage pipelined FFT, and when it occurs again in a later stage, an operation to multiply the two twiddle factors with each other is performed. This enables to eliminate roundoff errors during the butterfly operation 8p of radix-8. Other applications are also possible such as by overlaying a further stage by a butterfly operation of radix-2 or radix-4.

14 Claims, 5 Drawing Sheets

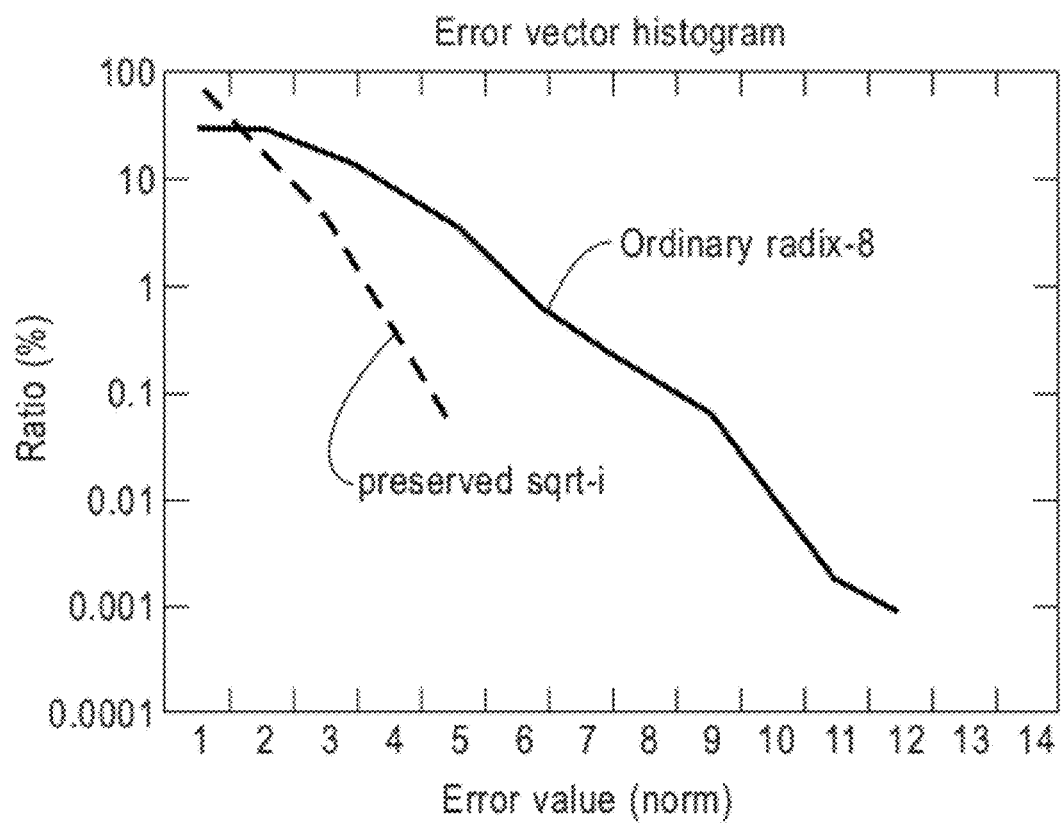

RADIX-8 FIXED-POINT FFT LOGIC CIRCUIT CHARACTERIZED BY PRESERVATION OF SQUARE ROOT-I OPERATION

CROSS-REFERENCE TO RELATED APPLICATION

This application claims priority under 35 U.S.C. §119 from Japanese Patent Application No. 2010-272947 filed Dec. 7, 2010, the entire contents of which are incorporated herein by reference.

BACKGROUND OF THE INVENTION

1. Field of the Invention

The present invention relates to a technique for Fast Fourier Transform (FFT) process.

2. Description of Related Art

As the bandwidth of communications increases, complex signal processing has been required on a greater amount of information. Such examples include the OFDM (Orthogonal Frequency Division Multiplexing) and the FDE (Frequency Domain Equalization), and the realization of these requires a high throughput FFT that utilizes hardware.

Hardware implementation of a high throughput FFT requires a large amount of hardware resources. ADC and DAC are utilized for the input and output of the FFT, which increases the operational speed associated with broadening bandwidths. Thus, the ENoB (Effective number of bits) of ADC and DAC is limited. The order, throughput, and ENoB value of ADC/DAC required for a currently desired FFT are listed below.

- 512-point (order N=512) FFT for IEEE802.15.3c (mm-Wave)
- 2.5G symbol per second
- 8-bit ADC/DAC for 2.5G sps In order to fulfill the above described requirements and to enable the FFT implementation with a minimized scale of circuit, some contrivance is needed such as using radix-8 which is higher than conventionally used radixes such as radix-2 and radix-4 and further implementing its operation based on a fixed point decimal (j bits, j is a natural number). However, a fixed-point FFT has a problem in that roundoff error during the operation increases.

In WO 2009/142563 A1 "METHOD FOR MOVING QUANTIZATION NOISE INTRODUCED IN FIXED-POINT CALCULATION OF FAST FOURIER TRANSFORMS" (International Patent Publication), which in the background considers the use of a fixed-point FFT for the purpose of a low-power and low cost implementation, a quantization error can occur. Such quantization error locally increases depending on the rotation within the FFT, and such an increased error is not likely to act as a noise source for the code to be transmitted/received upon occurring in the cyclic prefix portion of the OFDM in the time domain, but when on the contrary, the error is superposed on other portions, it will act as a noise source In WO 2009/142563 A1 "METHOD FOR MOVING QUANTIZATION NOISE INTRODUCED IN FIXED-POINT CALCULATION OF FAST FOURIER TRANS-FORMS" (International Patent Publication), in the frequency domain, when such error is superposed on the DC component, the error will increase, but when it is on the subcarrier side, the effect of the error will be small. Accordingly, there is disclosed a technique for reducing the effect of error on the code to be transmitted/received by shifting symbols after IFFT to displace the location where quantization error occurs.

In contrast, the present invention is a method for decreasing the quantization error within FFT and IFFT, and therefore is different from the technique of WO 2009/142563 A1 "METHOD FOR MOVING QUANTIZATION NOISE INTRODUCED IN FIXED-POINT CALCULATION OF FAST FOURIER TRANSFORMS" (International Patent Publication).

In U.S. Pat. No. 2005/0289207 A1 "FAST FOURIER TRANSFORM PROCESSOR, DYNAMIC SCALING METHOD AND FAST FOURIER TRANSFORM WITH RADIX-8 ALGORITHM" (US Patent Publication), in its background, as the order of FFT increases, the SQNR (signal to quantization noise ratio) decreases thereby causing an adverse effect. Reducing the adverse effect will require a longer word length as the number of operation bits within the FFT in the case of a higher order FFT. Moreover, in an FFT processor, a block-floating point is used in which effective digits of values of multiple adjacent input data are implemented so as to provide a common effective digit between adjacent values such that the entire multiple adjacent data have one effective digit.

U.S. Pat. No. 2005/0289207 A1 "FAST FOURIER TRANSFORM PROCESSOR, DYNAMIC SCALING METHOD AND FAST FOURIER TRANSFORM WITH RADIX-8 ALGORITHM" (US Patent Publication) discloses a method for performing a pipeline operating by dividing radix-8 into 3 stages (substantially expanding it into radix-2) to decrease the complex multiplication circuit by use of a block-floating point. Although this will reduce the amount of circuit, the latency required for operation increases by three times. Further, it discloses a method for scheduling so as to reduce the number of multiplication (3rd stage) by using a buffer to cash values called as a prefetch buffer, so that the normalization of block-floating is effectively implemented by making use of the prefetch buffer.

However, it has no technical idea corresponding to that of the present invention which preserves a 45-degree rotation portion in radix-8.

U.S. Pat. No. 2004/0111227 A1 "METHOD AND SYSTEM FOR FIXED POINT FAST FOURIER TRANSFORM WITH IMPROVED SNR" (US Patent Publication) discloses a method for scaling the output value so as to have a maximum value within a range not to overflow in each internal butterfly operation of FFT. It is considered to be relatively common method; but it relates to a different portion from that of the method for the present invention.

U.S. Pat. No. 2006/0282764 A1 "HIGH-THROUGHPUT PIPELINED FFT PROCESSOR" (US Patent Publication) discloses a hardware architecture for performing the operation of 128-bit FFT for UWB, the architecture having realized a butterfly-2 unit and radix-8 by dividing it into 3 stages (substantially combination of radix-2). It is a disclosure of a very particular architecture, and does not include the technical idea of the present invention.

WO 2007/115329 A2 "FFT ARCHITECTURE AND METHOD" (International Patent Publication) (National Publication (in Japanese) after transition to National Phase in Japan, National Publication of International Patent Application No. 2009-535678 "ARCHITECTURE AND METHOD FOR PIPELINE FFT") discloses an architecture and its operation of a pipeline-type FFT incorporating a butterfly operation of radix-2. That is quite different from the feature relating to the radix-8 of the present invention.

Cooley, James W., and John W. Tukey, "An algorithm for the machine calculation of complex Fourier series," Math. Comput. 19, 297-301, 1965. relates to a representative FFT algorithm known as the Cooley-Tukey FFT.

It is an object of the present invention to reduce roundoff errors in FFT operation.

SUMMARY OF THE INVENTION

In one aspect of the invention, a calculation system for processing a discrete Fourier transform (DFT) logic is presented. A multi-stage including $\log_8 N = \log_8 8^k = k$ stages are allocated in a pipelined array of which order N is a power of 8, a memory for preserving a processing result is provided in one stage of the multi-stage, an input value of the memory is subjected to an operation of a DFT of radix-8 to obtain an output value; and each of the input value and the output value is represented by a fixed point type (j bits, where j is a natural number), the system being configured to cause a computer to execute steps of preserving data which comes out as an irrational number out of twiddle factors (on a complex plane) included in a butterfly operation (8p) processed from 8 inputs (x0 to x7) in a predetermined stage in a pipelined array, in a memory provided in one stage of the multi-stage and obtaining calculation data (as a rational number) which is not an irrational number by multiplying data which comes out as an irrational number out of twiddle factors (on a complex plane) included in a butterfly operation (8p) processed from 8 inputs (x0 to x7) in a later stage (than one stage) in a pipelined array, with the data preserved in the memory.

In another aspect of the invention, a method for calculation for processing a discrete Fourier transform (DFT) logic is presented. A multi-stage including $\log_8 N = \log_8 8^k = k$ stages are allocated in a pipelined array of which order N is a power of 8, a memory for preserving a processing result is provided in one stage of the multi-stage, an input value of the memory is subjected to an operation of a DFT of radix-8 to obtain an output value and each of the input value and the output value is represented by a fixed point type (j bits, where j is a natural number). The method includes preserving data which comes out as an irrational number out of twiddle factors (on a complex plane) included in a butterfly operation (8p) processed from 8 inputs (x0 to x7) in a predetermined stage in a pipelined array, in a memory provided in one stage of the multi-stage and obtaining calculation data (as a rational number) which is not an irrational number by multiplying data which comes out as an irrational number out of twiddle factors (on a complex plane) included in a butterfly operation (8p) processed from 8 inputs (x0 to x7) in a later stage (than one stage) in a pipelined array, with the data preserved in the memory.

In yet another aspect of the invention, a computer readable storage medium tangibly embodying a computer readable program code having computer readable instructions which, when implemented, cause a computer to carry out the steps of a method for calculation for processing a discrete Fourier transform (DFT) logic, in which a multi-stage includes $\log_8 N = \log_8 8^k$ k stages are allocated in a pipelined array of which order N is a power of 8, a memory for preserving a processing result is provided in one stage of the multi-stage, an input value of the memory is subjected to an operation of a DFT of radix-8 to obtain an output value; and each of the input value and the output value is represented by a fixed point type (j bits, where j is a natural number). The method includes preserving data which comes out as an irrational number out of twiddle factors (on a complex plane) included in a butterfly operation (8p) processed from 8 inputs (x0 to x7) in a predetermined stage in a pipelined array, in a memory provided in one stage of the multi-stage and obtaining calculation data (as a rational number) which is not an irrational number by multiplying data which comes out as an irrational number out of twiddle factors (on a complex plane) included in a butterfly operation (8p) processed from 8 inputs (x0 to x7) in a later stage (than one stage) in a pipelined array, with the data preserved in the memory.

BRIEF DESCRIPTION OF THE DRAWINGS

FIG. 6 shows a histogram of errors; and

FIG. 7 shows an S/N ratio.

DETAILED DESCRIPTION OF THE PREFERRED EMBODIMENTS

Figure 1:
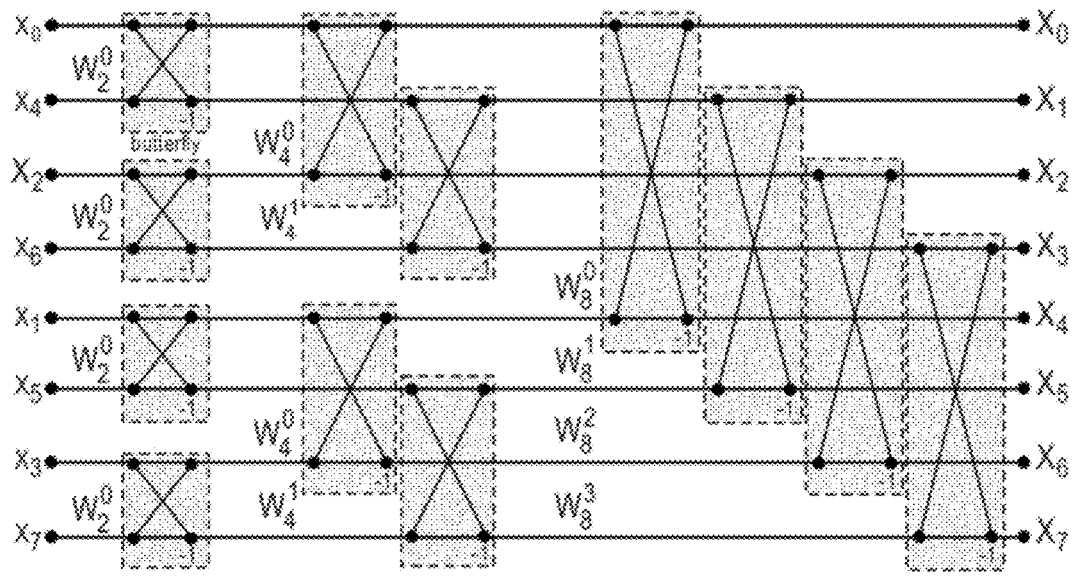
FIG. 1 shows the manner in which the butterfly operation of FFT for the case of radix-2 and order N=8 is performed.

An operation scheme and a circuit configuration for reducing operation errors with a limited circuit in an FFT of radix-8 is realized by making rotation terms $$\{W_8^{2n}\} \quad \text{[Expression 1]}$$

and $$\{W_8^{2n+1}\} \quad \text{[Expression 2]}$$

included in the butterfly operation to be separated, and preserving the term $$W_8^1 \quad \text{[Expression 3]}$$

included in Expression 2, within the FFT to avoid the operation thereof.

In a situation where equalization of power between input and output is needed during the operation of FFT/IFFT, when the order of FFT is an odd power of two:

$$(2^{2m+1}) \quad \text{[Expression 4]}$$

the equalization requires $$\sqrt{2} \quad \text{[Expression 5]}$$

times more operations. Such operation of the multiplication by √2 (square root of 2) at the time of amplitude change of the FFT/IFFT is determined with error being reduced by using the configuration of the present invention.

Since, by using the above described operation scheme, it becomes possible to reduce the errors of the operation of coordinate rotation by 45 degrees and the operation of multiplying the amplitude by √2 (square root of 2), taking advantage of such features, the coordinate plane is effectively utilized by rotating by 45 degrees the points to be outputted as a constellation on an ordinary axis and multiplying the amplitude by √2.

The roundoff error of FFT operation is reduced by the present invention.

Calculation Error of FFT and DFT

A Fast Fourier Transform (FFT) is an algorithm for computing a Discrete Fourier Transform (DFT) at a high speed. Representing the input as $$\{x_0 \ldots x_{N-1}\} \quad \text{[Expression 6]}$$

and the output as $$\{X_0 \ldots X_{N-1}\} \quad \text{[Expression 7]}$$

a DFT of order N is expressed by the following Expression 8:

$$X_k = \sum_{n=0}^{N-1} x_n \cdot e^{-\frac{2\pi i}{N}nk} = \sum_{n=0}^{N-1} x_n \cdot W_N^{nk} \quad \text{[Expression 8]}$$

In Expression 8, $$e^{-\frac{2\pi i}{N}nk}(=W_N^{nk}) \quad \text{[Expression 9]}$$

is a "twiddle factor"; in a Discrete Fourier Transform of order N, complex multiplication between the input and the twiddle factor is performed N times, and complex summation of those N terms is performed.

The calculation error of DFT is caused by this complex multiplication and complex summation. In order to calculate Xk, N times of complex multiplications and N times of complex summation are required when the formula of DFT is computed as it is.

When DFT is determined by a floating-point operation, a calculation error due to rounding off is caused depending on the effective number of digits of fixed-point part either in the case of multiplication and summation. Similarly in a fixed-point operation, a value smaller than the effective digit is rounded off, and an operation result exceeding the effective digit will result in an overflow so that the operation result is fixed to a maximum value and an accurate value will not be obtained. The maximum value of roundoff error increases in proportion to the number of times the operation result is reused for computation.

FFT of Radix-2 and Calculation Error

As a representative FFT algorithm, there is known the Cooley-Tukey FFT (Cooley, James W., and John W. Tukey, "An algorithm for the machine calculation of complex Fourier series," Math. Comput. 19, 297-301, 1965.), which is a high-speed algorithm to perform DFT of order N within the following amount of operations:

$$O(N \cdot \log N) \quad \text{[Expression 10]}$$

When calculating a FFT of higher order, a method for performing the operation by diving it into several groups is taken, in which the number of inputs/outputs of a group during operation is called as a "radix", and which enables to increase the efficiency of the operation through appropriate selection of a common operation part.

As an example, in the case of FFT of radix-2, for certain two points $$X_{i0}, X_{i1} \quad \text{[Expression 11]}$$

to be subjected to FFT, the operation is performed by repeating the butterfly operation shown by Expression 14 over $$\log_2 N \quad \text{[Expression 12]}$$

stages.

FIG. 1 shows the manner in which the butterfly operation of FFT for the case of radix-2 and order N=8 is performed.

The shaded portion in the figure, which indicates a butterfly operation portion represented by the following Expression 14, is a common operation.

The term $$W_N^k \quad \text{[Expression 13]}$$

which comes out between butterfly operations is called a "twiddle factor" and represents an operation to rotate the input values on a complex plane.

$$\begin{pmatrix} X_{i0} \\ X_{i1} \end{pmatrix} = \begin{pmatrix} W_2^0 & W_2^0 \\ W_2^0 & W_2^1 \end{pmatrix} \begin{pmatrix} x_{i0} \\ x_{i1} \end{pmatrix} \quad \text{[Expression 14]}$$

The calculation error of FFT is caused by the complex summation and multiplication of the above described butterfly operation, and the rotation by the twiddle factor. In the case of FFT of radix-2 and order N, to calculate a certain Xk, the butterfly operation and the rotations by the twiddle factor are performed by the number of times shown by Expression 11. Since such operations include complex summations/subtractions and multiplications, calculation errors and roundoff due to effective digit manipulation occur for every operation in the case of fixed point decimal.

FFT of Radix-8 and Calculation Error

As a method for reducing the number of operations (especially multiplications) within FFT, a method for using a larger radix is generally known. As an example, an operation corresponding to the butterfly operation in the case of radix-8 is shown by the following Expression 15. Because of radix-8, the input/output to be treated in one operation becomes 8-dimensional, and the butterfly operation is shown as a matrix including twiddle factors.

$$8p \overset{def}{\to} \begin{pmatrix} X_{i0} \\ X_{i1} \\ X_{i2} \\ X_{i3} \\ X_{i4} \\ X_{i5} \\ X_{i6} \\ X_{i7} \end{pmatrix} = \quad \text{[Expression 15]}$$

$$\begin{pmatrix} W_8^0 & W_8^0 & W_8^0 & W_8^0 & W_8^0 & W_8^0 & W_8^0 & W_8^0 \\ W_8^0 & W_8^1 & W_8^2 & W_8^3 & W_8^4 & W_8^5 & W_8^6 & W_8^7 \\ W_8^0 & W_8^2 & W_8^4 & W_8^6 & W_8^0 & W_8^2 & W_8^4 & W_8^6 \\ W_8^0 & W_8^3 & W_8^6 & W_8^1 & W_8^4 & W_8^7 & W_8^2 & W_8^5 \\ W_8^0 & W_8^4 & W_8^0 & W_8^4 & W_8^0 & W_8^4 & W_8^0 & W_8^4 \\ W_8^0 & W_8^5 & W_8^2 & W_8^7 & W_8^4 & W_8^1 & W_8^6 & W_8^3 \\ W_8^0 & W_8^6 & W_8^4 & W_8^2 & W_8^0 & W_8^6 & W_8^4 & W_8^2 \\ W_8^0 & W_8^7 & W_8^6 & W_8^5 & W_8^4 & W_8^3 & W_8^2 & W_8^1 \end{pmatrix} \begin{pmatrix} x_{i0} \\ x_{i1} \\ x_{i2} \\ x_{i3} \\ x_{i4} \\ x_{i5} \\ x_{i6} \\ x_{i7} \end{pmatrix}$$

Figure 2:
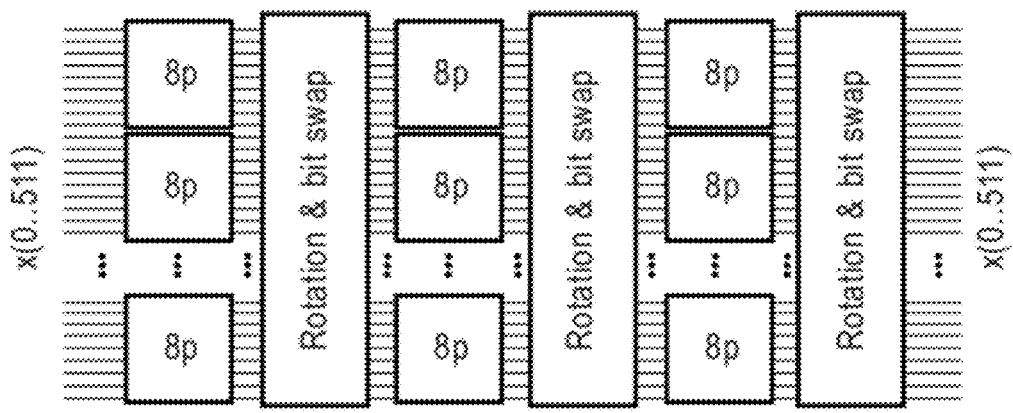
FIG. 2 shows in what order the butterfly operation of radix-8 (denoted by 8p) is processed in the entire FFT.

FIG. 2 shows in which order the butterfly operation of radix-8 (denoted by 8p) is processed in the entire FFT. FIG. 2 illustrates the case of an FFT of order N=512 in which x on the left side is input to the FFT, and X on the right side is output. Since 8p is the operation of radix-8, the order N of the array is a power of 8, and when a multi-stage consisting of $$\log_8 N = \log_8 8^k = k \quad \text{[Expression 16]}$$

is allocated to a pipelined array, the operation of 8p needs to be performed k times. Therefore, to perform the FFT of order N=512, 8p is applied to a certain input x three times as shown in FIG. 2. A "rotation & bit swap" between 8p operations is a replacement portion of the twiddle factor and the bits.

Here, $$W_8^k = \cos\left(\frac{2\pi}{8} \times k\right) + i\sin\left(\frac{2\pi}{8} \times k\right) \quad \text{[Expression 17]}$$

(where $k = \{0 \ldots 7\}$)

in the 8p operation is a rotation on the complex plane, and becomes an irrational number especially when k is an odd number causing a roundoff error. Since the 8p operation is performed three times in the example of order N=512, roundoff errors of three operations will accumulate.

Radix-8 fixed-point FFT preserving square root-i ($\sqrt{i}$) operation

The present invention discloses a method for reducing the roundoff error of this radix-8 butterfly operation. It is described in the previous section that when k is an odd number, $$W_8^k \quad \text{[Expression 18]}$$

will become an irrational number thereby causing a roundoff error. Now supposing that n is an integer, Expression 18, which will become an irrational number, can be expressed as $$W_8^{2n+1} \quad \text{[Expression 19]}$$

Where, consider $$W_8^{2m+1} \text{ (where m is an integer)} \quad \text{[Expression 20]}$$

as another Expression 18 which will become an irrational number.

The multiplication between these twiddle factors of odd numbers can be deformed as follows:

$$\begin{aligned}
W_8^{2n+1} \times W_8^{2m+1} &= W_8^{(2n+1)+(2m+1)} \quad \text{[Expression 21]} \\
&= W_8^{2(n+m+1)} \\
&= \cos\left\{\frac{2\pi}{8} \times 2(n+m+1)\right\} + \\
&\quad i\sin\left\{\frac{2\pi}{8} \times 2(n+m+1)\right\} \\
&= \cos\left\{\frac{\pi}{2} \times (n+m+1)\right\} + \\
&\quad i\sin\left\{\frac{\pi}{2} \times (n+m+1)\right\}
\end{aligned}$$

The value of Expression 21 becomes either of $$\{\pm 1, \pm i\} \quad \text{[Expression 22]}$$

and will not produce a roundoff error in this operation.

It is a method for the present invention in which, taking advantage of the above described features, Expression 18 in which k is an odd number is not calculated on purpose, and when another Expression 18 in which k is an odd number takes place again in a later stage of FFT, the operation is performed by multiplying these two twiddle factors with each other to eliminate the roundoff error in the butterfly operation 8p of radix-8.

Figure 3:
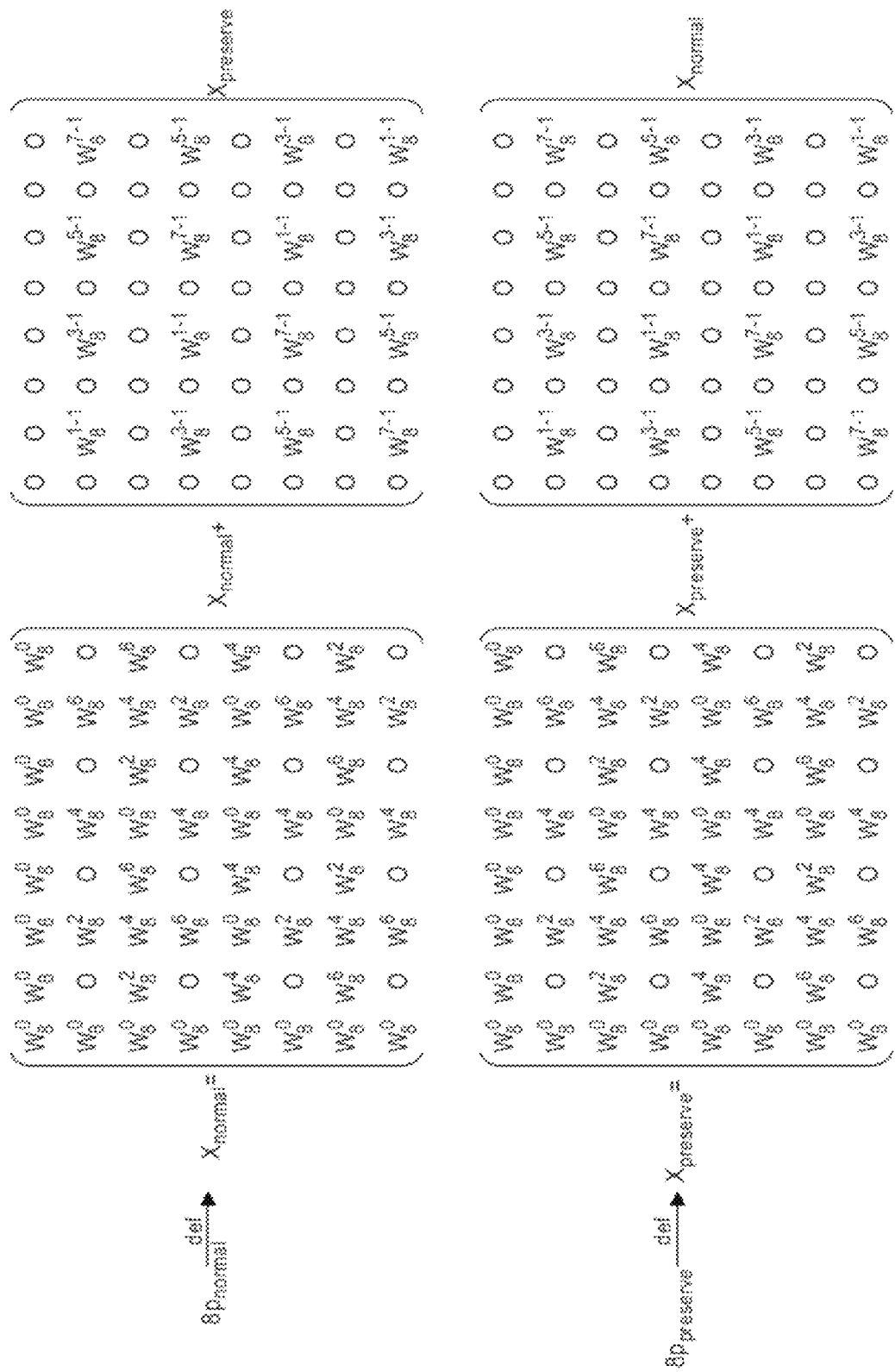
FIG. 3 shows a butterfly operation formula of radix-8 when the operation of a twiddle factor in which k is an odd number is preserved.

FIG. 3 shows a butterfly operation formula of radix-8 when the operation of a twiddle factor in which k is an odd number is preserved.

$$8p_{normal} \quad \text{[Expression 23]}$$

consists of terms of Expression 18 (twiddle factor) in which k is an even number, and $$8p_{preserve} \quad \text{[Expression 24]}$$

consists of terms of Expression 18 (twiddle factors) in which k is an odd number.

The operation is performed by this Expression 23 and Expression 24 (which is to be preserved) alternately acting on each other to exchange their values at every butterfly operation of radix-8.

The process is represented by Expressions 25 and 26 shown below.

$$8p_{normal} \stackrel{def}{\rightarrow} X_{normal} = \quad \text{[Expression 25]}$$

$$\begin{pmatrix} W_8^0 & W_8^0 & W_8^0 & W_8^0 & W_8^0 & W_8^0 & W_8^0 & W_8^0 \\ W_8^0 & 0 & W_8^2 & 0 & W_8^4 & 0 & W_8^6 & 0 \\ W_8^0 & W_8^2 & W_8^4 & W_8^6 & W_8^0 & W_8^2 & W_8^4 & W_8^6 \\ W_8^0 & 0 & W_8^6 & 0 & W_8^4 & 0 & W_8^2 & 0 \\ W_8^0 & W_8^4 & W_8^0 & W_8^4 & W_8^0 & W_8^4 & W_8^0 & W_8^4 \\ W_8^0 & 0 & W_8^2 & 0 & W_8^4 & 0 & W_8^6 & 0 \\ W_8^0 & W_8^6 & W_8^4 & W_8^2 & W_8^0 & W_8^6 & W_8^4 & W_8^2 \\ W_8^0 & 0 & W_8^6 & 0 & W_8^4 & 0 & W_8^2 & 0 \end{pmatrix} x_{normal} +$$

$$\begin{pmatrix} 0 & 0 & 0 & 0 & 0 & 0 & 0 & 0 \\ 0 & W_8^{1+1} & 0 & W_8^{3+1} & 0 & W_8^{5+1} & 0 & W_8^{7+1} \\ 0 & 0 & 0 & 0 & 0 & 0 & 0 & 0 \\ 0 & W_8^{3+1} & 0 & W_8^{1+1} & 0 & W_8^{7+1} & 0 & W_8^{5+1} \\ 0 & 0 & 0 & 0 & 0 & 0 & 0 & 0 \\ 0 & W_8^{5+1} & 0 & W_8^{7+1} & 0 & W_8^{1+1} & 0 & W_8^{3+1} \\ 0 & 0 & 0 & 0 & 0 & 0 & 0 & 0 \\ 0 & W_8^{7+1} & 0 & W_8^{5+1} & 0 & W_8^{3+1} & 0 & W_8^{1+1} \end{pmatrix} x_{preserve}$$

$$8p_{preserve} \stackrel{def}{\rightarrow} X_{preserve} = \quad \text{[Expession 26]}$$

$$\begin{pmatrix} W_8^0 & W_8^0 & W_8^0 & W_8^0 & W_8^0 & W_8^0 & W_8^0 & W_8^0 \\ W_8^0 & 0 & W_8^2 & 0 & W_8^4 & 0 & W_8^6 & 0 \\ W_8^0 & W_8^2 & W_8^4 & W_8^6 & W_8^0 & W_8^2 & W_8^4 & W_8^6 \\ W_8^0 & 0 & W_8^6 & 0 & W_8^4 & 0 & W_8^2 & 0 \\ W_8^0 & W_8^4 & W_8^0 & W_8^4 & W_8^0 & W_8^4 & W_8^0 & W_8^4 \\ W_8^0 & 0 & W_8^2 & 0 & W_8^4 & 0 & W_8^6 & 0 \\ W_8^0 & W_8^6 & W_8^4 & W_8^2 & W_8^0 & W_8^6 & W_8^4 & W_8^2 \\ W_8^0 & 0 & W_8^6 & 0 & W_8^4 & 0 & W_8^2 & 0 \end{pmatrix} x_{preserve} +$$

$$\begin{pmatrix} 0 & 0 & 0 & 0 & 0 & 0 & 0 & 0 \\ 0 & W_8^{1-1} & 0 & W_8^{3-1} & 0 & W_8^{5-1} & 0 & W_8^{7-1} \\ 0 & 0 & 0 & 0 & 0 & 0 & 0 & 0 \\ 0 & W_8^{3-1} & 0 & W_8^{1-1} & 0 & W_8^{7-1} & 0 & W_8^{5-1} \\ 0 & 0 & 0 & 0 & 0 & 0 & 0 & 0 \\ 0 & W_8^{5-1} & 0 & W_8^{7-1} & 0 & W_8^{1-1} & 0 & W_8^{3-1} \\ 0 & 0 & 0 & 0 & 0 & 0 & 0 & 0 \\ 0 & W_8^{7-1} & 0 & W_8^{5-1} & 0 & W_8^{3-1} & 0 & W_8^{1-1} \end{pmatrix} x_{normal}$$

Figure 4:
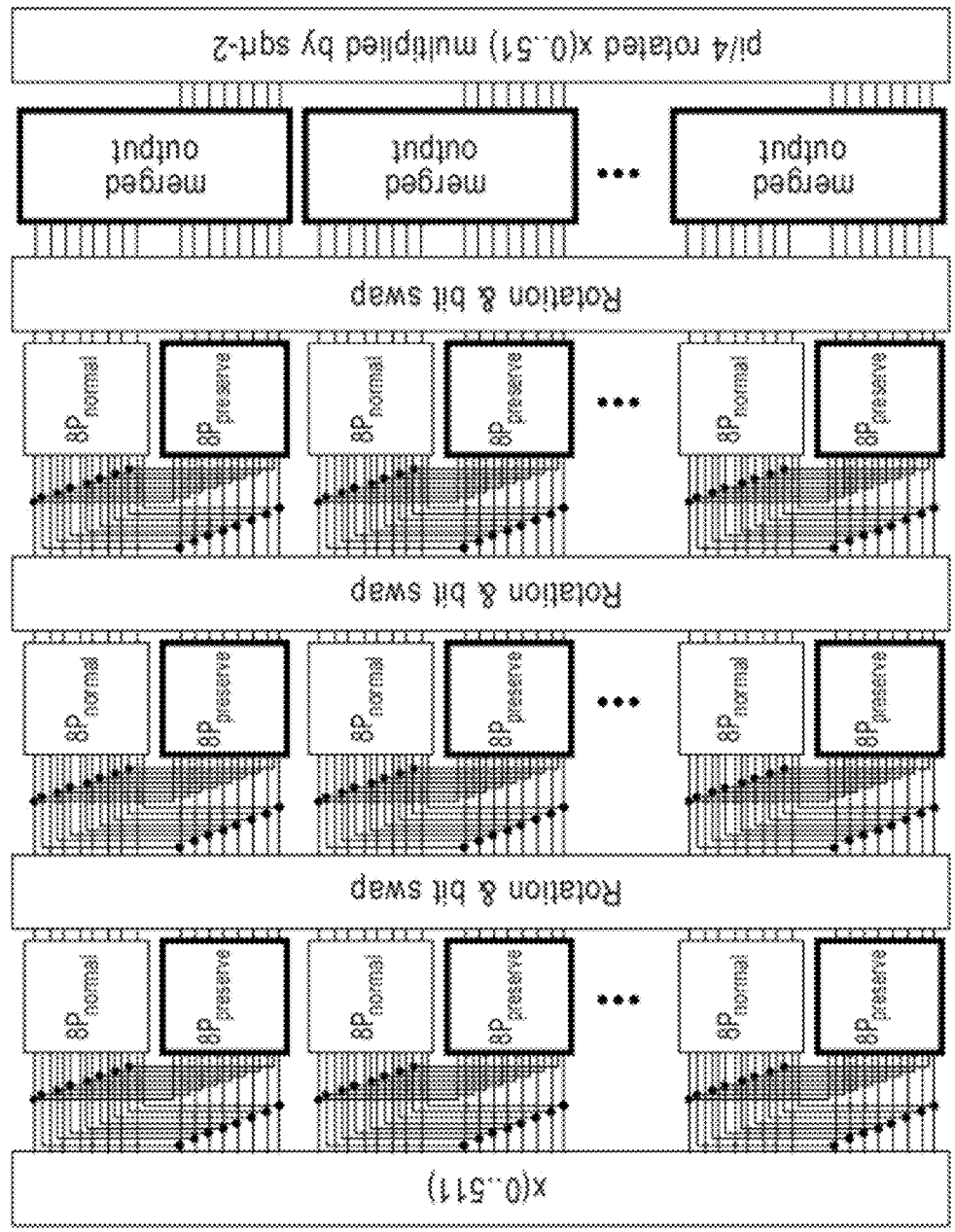
FIG. 4 shows the manner in which the formula shown in FIG. 3 is specifically configured.

FIG. 4 shows the manner in which the formula shown in FIG. 3 is specifically configured.

Expressions 23 and 24 are arranged in parallel, and inputs thereof are respectively processed to propagate values to a later stage. Since Expression 24 outputs values of Expression 18 in which k is an odd number, which are preserved in an unprocessed state, a merged output in the end of FIG. 4 obtains a final FFT operation result by performing the unprocessed operation in the merged output portion and appropriately summing up the result with Expression 23.

While such a configuration is realized as a system or method for causing a computer to execute it, it can be utilized for a memory as hardware resources or a (virtual) memory of array element as the software by which hardware resources and software resources cooperate to perform "preservation".

APPLICATION EXAMPLE 1 OF THE PRESENT INVENTION

Although the present invention intends to reduce the roundoff error of FFT of radix-8, applications to make use of the features of this configuration can be considered.

A first application example is the equalization of power of FFT/IFFT. In FFT/IFFT, the relationship of the power of input/output as shown by Perseval's law of Expression 30 shown below holds. The following Expression 30 means that when the power of input/output is equalized, it is necessary to divide the amplitude of the operation result of FFT by the square root of the order thereof. When N=512, the result is as follows:

$$\sqrt{N} = 16\sqrt{2} \quad \text{[Expression 27]}$$

Since the division of $$\sqrt{2} \quad \text{[Expression 28]}$$

is an operation of irrational numbers, roundoff errors occur here as well in an ordinary operation.

It has been described that the present method is configured to preserve Expression 18 (twiddle factor) in which k is an odd number. It specifically means that in Expression 18 (twiddle factor) in which k is an odd number, the real part and the imaginary part are preserved respectively without being subjected to complex multiplication by $$\pm \frac{1}{\sqrt{2}} \quad \text{[Expression 29]}$$

Thus, when the equalization of the above described power is performed, the output of Expression 24 of the present scheme will have already been divided by an irrational number $\sqrt{2}$. That is, it becomes possible to eliminate the division by $\sqrt{2}$ thus enabling the reduction of roundoff error compared with an ordinary FFT implementation.

$$\sum_{n=0}^{N-1} |x_n|^2 = \frac{1}{N} \sum_{k=0}^{N-1} |X_k|^2 = \sum_{k=0}^{N-1} \left| \frac{X_k}{\sqrt{N}} \right|^2 \quad \text{[Expression 30]}$$

APPLICATION EXAMPLE 2 OF THE PRESENT INVENTION

As a second application example, when considering a transmitter/receiver device that outputs symbols by modification of BPSK and QPSK, etc. on a real and imaginary axes, it is possible to increase the amplitude of a symbol without changing ADC/DAC by intentionally rotating the symbol by 45 degrees and multiplying the amplitude by $\sqrt{2}$.

Figure 5:
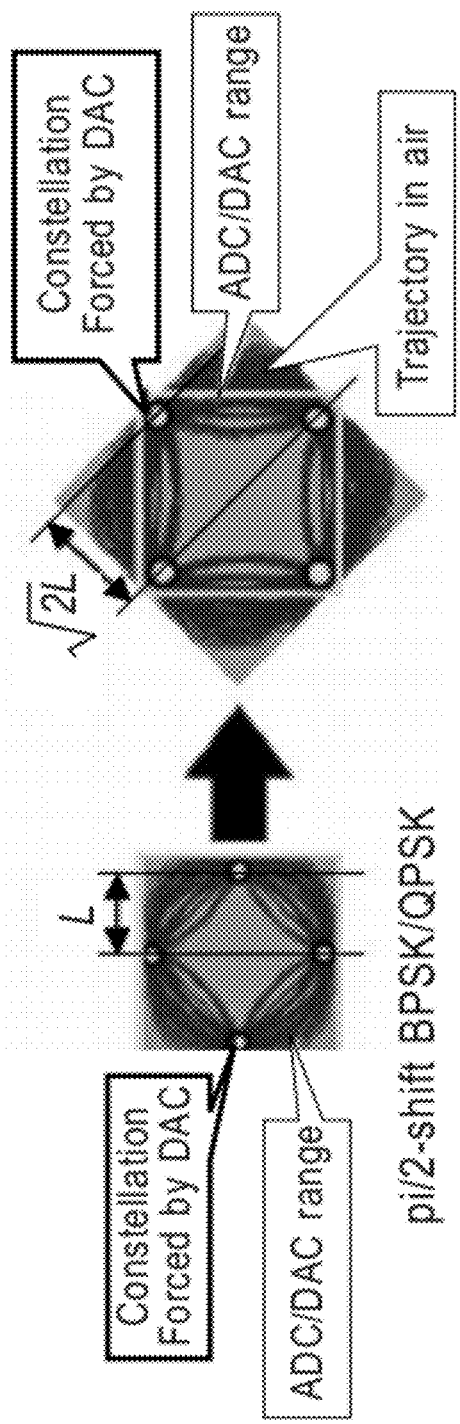
FIG. 5 shows an example of amplitude magnification without change of ADC/DAC by the rotation of symbol on the axis and amplitude change.

FIG. 5 shows an example of amplitude magnification without change of ADC/DAC by the rotation of symbols on the axis and the amplitude change.

The left figure of FIG. 5 represents a case in which a symbol is placed on the axis, in which the symbol is placed at a maximum spacing L of the range of ADC/DAC. The right figure represents a state in which the symbol is rotated by 45 degrees and the amplitude is multiplied by $\sqrt{2}$ (square root of 2). Although the amplitude has increased $\sqrt{2}$ times, the symbol is placed within the range of ADC/DAC.

In the operation of such 45-degree rotation and the multiplication of amplitude by $\sqrt{2}$, there are terms for which the calculation of rotation and the multiplication of amplitude by $\sqrt{2}$ can be omitted by using the inventive method from the same reason as described in the first example.

As so far described, there can be a case in which the inventive method enables not only to reduce the roundoff error within an FFT, but also to eliminate operations such as 45-degree rotation and the multiplication of amplitude by $\sqrt{2}$ relating to the input/output of the FFT, and it becomes possible to reduce the calculation error in such a case.

APPLICATION EXAMPLE 3 OF THE PRESENT INVENTION

Even when the order N is increased, by incorporating the present invention for the case of order N=512 as the base, it is possible to apply the present invention by adding the butterfly operation of radix-2, or the butterfly operation of radix 4 in an overlying fashion as shown below:
When N=1024, a 4-stage configuration of radix-8-radix-8-radix-8-radix-2;
when N=2048, a five-stage configuration of radix-8-radix-8-radix-8-radix-2-radix-2;
when N=2048, a four-stage configuration of radix-8-radix-8-radix-8-radix-4; and
when N=4096, a four-stage configuration of radix-8-radix-8-radix-8-radix-8.
That is, even when the order N is a power of two, but not a power of eight, the operation can be performed.

A verification is conducted on the degree of effectiveness to reduce the roundoff error by the application of the present invention. A comparison target is set to be a case in which FFT is performed by a floating-point operation with a sufficient accuracy, and a histogram and S/N ratio relating to the error which occurs when FFT is performed by a fixed-point (8 bit) operation are determined.

FIG. 6 shows a histogram of error.
FIG. 7 shows an S/N ratio.

The abscissa of the histogram of FIG. 6 is a vector distance of the error with respect to an expected value, and as an example, when an value obtained with respect to an expected value (127, 127) has an error, such as being (130, 131), the vector distance is given as follows:

$$\sqrt{\{(130-127)^2 + (131-127)^2\}} = 5 \quad \text{[Expression 31]}$$

The ordinate indicates an overall percentage of the frequency of the error obtained by experiment. These results reveal that in a normal FFT of radix-8 (FIG. 2) without use of the present invention, the maximum value of the vector distance of error is 12, but in contrast to that, the maximum value is 5 when the present invention is applied. FIG. 7 represents the same results by S/N ratio showing that an improvement of about 6 dB is obtained by the application of the present invention.

The invention claimed is:

1. A calculation system for processing a discrete Fourier transform (DFT) logic, comprising:

a memory for preserving a processing result provided in one stage of a multi-stage; and a pipelined array including the multi-stage in the memory, the system being configured to cause a computer to execute steps of:

preserving data which comes out as an irrational number out of twiddle factors (on a complex plane) included in a butterfly operation (8p) processed from 8 inputs (x0 to x7) in a predetermined stage in a pipelined array, in a memory provided in one stage of the multi-stage; and obtaining calculation data (as a rational number) which is not an irrational number by multiplying data which comes out as an irrational number out of twiddle factors (on a complex plane) included in a butterfly operation (8p) processed from 8 inputs (x0 to x7) in a later stage (than one stage) in a pipelined array, with the data preserved in the memory.

2. The system according to claim 1 in which a multi-stage consisting of $$\log_8 N = \log_8 8^k = k \quad \text{[Expression 1]}$$

stages are allocated in a pipelined array of which order N is a power of 8; a memory for preserving a processing result is provided in one stage of the multi-stage; an input value of the memory is subjected to an operation of a DFT of radix-8 to obtain an output value; and each of the input value and the output value is represented by a fixed point type (j bits, where j is a natural number).

3. The system according to claim 2, characterized in that the irrational number is a square root.

4. The system according to claim 2, wherein a twiddle factor on a complex plane included in a butterfly operation (8p) of radix-8 is given as $$W_8^k = \cos\left(\frac{2\pi}{8} \times k\right) + i\sin\left(\frac{2\pi}{8} \times k\right) \quad \text{[Expression 2]}$$

(where $k = \{0 \ldots 7\}$)

where k is an odd number.

5. The system according to claim 2, wherein the butterfly operation (8p) is given as $$8p \stackrel{def}{\rightarrow} \begin{pmatrix} X_{i0} \\ X_{i1} \\ X_{i2} \\ X_{i3} \\ X_{i4} \\ X_{i5} \\ X_{i6} \\ X_{i7} \end{pmatrix} = \quad \text{[Expression 3]}$$

$$\begin{pmatrix} W_8^0 & W_8^0 & W_8^0 & W_8^0 & W_8^0 & W_8^0 & W_8^0 & W_8^0 \\ W_8^0 & W_8^1 & W_8^2 & W_8^3 & W_8^4 & W_8^5 & W_8^6 & W_8^7 \\ W_8^0 & W_8^2 & W_8^4 & W_8^6 & W_8^0 & W_8^2 & W_8^4 & W_8^6 \\ W_8^0 & W_8^3 & W_8^6 & W_8^1 & W_8^4 & W_8^7 & W_8^2 & W_8^5 \\ W_8^0 & W_8^4 & W_8^0 & W_8^4 & W_8^0 & W_8^4 & W_8^0 & W_8^4 \\ W_8^0 & W_8^5 & W_8^2 & W_8^7 & W_8^4 & W_8^1 & W_8^6 & W_8^3 \\ W_8^0 & W_8^6 & W_8^4 & W_8^2 & W_8^0 & W_8^6 & W_8^4 & W_8^2 \\ W_8^0 & W_8^7 & W_8^6 & W_8^5 & W_8^4 & W_8^3 & W_8^2 & W_8^1 \end{pmatrix} \begin{pmatrix} x_{i0} \\ x_{i1} \\ x_{i2} \\ x_{i3} \\ x_{i4} \\ x_{i5} \\ x_{i6} \\ x_{i7} \end{pmatrix}.$$

6. The system according to claim 2, wherein when order N is a power of two, but not a power of eight, a further stage by a butterfly operation of radix-2 or radix-4 is overlaid.

7. A method for calculation for processing a discrete Fourier transform (DFT) logic, comprising:

a memory for preserving a processing result provided in one stage of a multi-stage; and a pipelined array including the multi-stage in the memory, the method comprising:

preserving data which comes out as an irrational number out of twiddle factors (on a complex plane) included in a butterfly operation (8p) processed from 8 inputs (x0 to x7) in a predetermined stage in a pipelined array, in a memory provided in one stage of the multi-stage; and obtaining calculation data (as a rational number) which is not an irrational number by multiplying data which comes out as an irrational number out of twiddle factors (on a complex plane) included in a butterfly operation (8p) processed from 8 inputs (x0 to x7) in a later stage (than one stage) in a pipelined array, with the data preserved in the memory.

8. The method according to claim 7 in which a multi-stage consisting of $$\log_8 N = \log_8 8^k = k \quad \text{[Expression 1]}$$

stages are allocated in a pipelined array of which order N is a power of 8; a memory for preserving a processing result is provided in one stage of the multi-stage; an input value of the memory is subjected to an operation of a DFT of radix-8 to obtain an output value; and each of the input value and the output value is represented by a fixed point type (j bits, where j is a natural number).

9. The method according to claim 8, characterized in that the irrational number is a square root.

10. The method according to claim 8, wherein a twiddle factor on a complex plane included in a butterfly operation (8p) of radix-8 is given as $$W_8^k = \cos\left(\frac{2\pi}{8} \times k\right) + i\sin\left(\frac{2\pi}{8} \times k\right) \quad \text{[Expression 5]}$$

(where $k = \{0 \ldots 7\}$)

where k is an odd number.

11. The method according to claim 8 wherein the butterfly operation (8p) is given as $$8p \overset{def}{\rightarrow} \begin{pmatrix} X_{i0} \\ X_{i1} \\ X_{i2} \\ X_{i3} \\ X_{i4} \\ X_{i5} \\ X_{i6} \\ X_{i7} \end{pmatrix} =$$

[Expression 3]

$$\begin{pmatrix} w_8^0 & w_8^0 & w_8^0 & w_8^0 & w_8^0 & w_8^0 & w_8^0 & w_8^0 \\ w_8^0 & w_8^1 & w_8^2 & w_8^3 & w_8^4 & w_8^5 & w_8^6 & w_8^7 \\ w_8^0 & w_8^2 & w_8^4 & w_8^6 & w_8^0 & w_8^2 & w_8^4 & w_8^6 \\ w_8^0 & w_8^3 & w_8^6 & w_8^1 & w_8^4 & w_8^7 & w_8^2 & w_8^5 \\ w_8^0 & w_8^4 & w_8^0 & w_8^4 & w_8^0 & w_8^4 & w_8^0 & w_8^4 \\ w_8^0 & w_8^5 & w_8^2 & w_8^7 & w_8^4 & w_8^1 & w_8^6 & w_8^3 \\ w_8^0 & w_8^6 & w_8^4 & w_8^2 & w_8^0 & w_8^6 & w_8^4 & w_8^2 \\ w_8^0 & w_8^7 & w_8^6 & w_8^5 & w_8^4 & w_8^3 & w_8^2 & w_8^1 \end{pmatrix} \begin{pmatrix} x_{i0} \\ x_{i1} \\ x_{i2} \\ x_{i3} \\ x_{i4} \\ x_{i5} \\ x_{i6} \\ x_{i7} \end{pmatrix}.$$

12. The method according to claim 8, wherein when order N is a power of two, but not a power of eight, a further stage by a butterfly operation of radix-2 or radix-4 is overlaid.

13. A non-transistory computer readable storage medium tangibly embodying a computer readable program code having computer readable instructions which, when implemented, cause a computer to carry out the steps of a method for calculation for processing a discrete Fourier transform (DFT) logic, comprising:
 a memory for preserving a processing result provided in one stage of a multi-stage; and
 a pipelined array including the multi-stage in the memory, the method comprising:
 preserving data which comes out as an irrational number out of twiddle factors (on a complex plane) included in a butterfly operation (8p) processed from 8 inputs (x0 to x7) in a predetermined stage in a pipelined array, in a memory provided in one stage of the multi-stage; and
 obtaining calculation data (as a rational number) which is not an irrational number by multiplying data which comes out as an irrational number out of twiddle factors (on a complex plane) included in a butterfly operation (8p) processed from 8 inputs (x0 to x7) in a later stage (than one stage) in a pipelined array, with the data preserved in the memory.

14. The method according to claim 13 in which a multi-stage consisting of $$\log_8 N = \log_8 8^k = k$$ [Expression 1]

stages are allocated in a pipelined array of which order N is a power of 8; a memory for preserving a processing result is provided in one stage of the multi-stage; an input value of the memory is subjected to an operation of a DFT of radix-8 to obtain an output value; and each of the input value and the output value is represented by a fixed point type (j bits, where j is a natural number).

\* \* \* \* \*